(12) United States Patent
Kitamura et al.

(10) Patent No.: US 8,772,400 B2
(45) Date of Patent: Jul. 8, 2014

(54) POLYVINYL ALCOHOL-BASED FILM FOR OPTICAL USE, POLARIZING FILM, AND POLARIZING PLATE

(75) Inventors: Shuichi Kitamura, Osaka (JP);
Katsuhiko Katsuma, Osaka (JP);
Mitsuo Shibutani, Osaka (JP);
Toshihiro Shimizu, Osaka (JP)

(73) Assignee: The Nippon Synthetic Chemical Industry Co., Ltd., Osaka (JP)

( * ) Notice: Subject to any disclaimer, the term of this patent is extended or adjusted under 35 U.S.C. 154(b) by 834 days.

(21) Appl. No.: 12/309,657

(22) PCT Filed: Jul. 27, 2006

(86) PCT No.: PCT/JP2006/314911
§ 371 (c)(1),
(2), (4) Date: Jan. 26, 2009

(87) PCT Pub. No.: WO2008/012902
PCT Pub. Date: Jan. 31, 2008

(65) Prior Publication Data
US 2009/0316264 A1   Dec. 24, 2009

(51) Int. Cl.
*C08L 29/04*   (2006.01)

(52) U.S. Cl.
USPC ........... 524/503; 264/1.1; 264/1.31; 428/220; 428/332; 428/333; 428/394

(58) Field of Classification Search
USPC .......... 264/1.1, 1.31; 428/220, 332, 333, 394; 524/503
See application file for complete search history.

(56) References Cited

U.S. PATENT DOCUMENTS

| | | | |
|---|---|---|---|
| 2003/0114566 A1 | 6/2003 | Hayashi et al. | |
| 2003/0178608 A1* | 9/2003 | Isozaki et al. | 252/585 |
| 2008/0113173 A1 | 5/2008 | Hayakawa et al. | |
| 2009/0023880 A1 | 1/2009 | Shibutani | |

FOREIGN PATENT DOCUMENTS

| JP | 8-136728 | 5/1996 | |
|---|---|---|---|
| JP | 11-119023 | 4/1999 | |
| JP | 2001206960 A | * 7/2001 | ................. C08J 5/18 |
| JP | 2002-146139 | 5/2002 | |
| JP | 2002174726 A | * 6/2002 | ............. C08L 29/04 |
| JP | 2003-248123 | 9/2003 | |
| JP | 200475866 A | * 3/2004 | ............. C08L 29/04 |
| JP | 2004-285143 | 10/2004 | |
| JP | 2004285143 A | * 10/2004 | ........... C08F 216/06 |
| JP | 2004-341503 | 12/2004 | |
| JP | 2005-120115 | 5/2005 | |
| JP | 2005120114 A | * 5/2005 | ............. C08L 29/04 |
| JP | 2005120115 A | * 5/2005 | ............. C08L 29/04 |
| TW | 200607817 | 3/2006 | |
| TW | 200624477 | 7/2006 | |

OTHER PUBLICATIONS

"Poval", newly-revised edition, Koichi Nagano, Saburo Yamane, and Kentaro Toyoshima, *Koubunshi Kankokai* (Polymer Publishing Group), pp. 142-144, 1989 (partial translation).

* cited by examiner

*Primary Examiner* — David W Wu
*Assistant Examiner* — Marie Reddick
(74) *Attorney, Agent, or Firm* — Hamre, Schumann, Mueller & Larson, P.C.

(57) ABSTRACT

The present invention provides a polyvinyl alcohol-based film for optical uses, which is excellent in stretching property and is used for producing a polarizing film excellent in polarization performance throughout the visible light wavelength range, particularly in the vicinity of the wavelength of 460 nm. The invention relates to a polyvinyl alcohol-based film for optical uses comprising a polyvinyl alcohol-based resin, wherein the polyvinyl alcohol-based resin is composed of only a polyvinyl alcohol-based resin (A) containing a 1,2-glycol bond at a side chain and the amount of the 1,2-glycol bond at a side chain is from 0.01 to 6% by mol, or a polyvinyl alcohol-based film for optical uses comprising a polyvinyl alcohol-based resin, wherein the polyvinyl alcohol-based resin includes a polyvinyl alcohol-based resin (A) containing a 1,2-glycol bond at a side chain and a polyvinyl alcohol-based resin (B) other than the polyvinyl alcohol-based resin (A) and satisfies the following expression (1):

$$0.01 \leq A \times G/(A+B) \leq 6 \quad (1)$$

wherein A represents a content ratio (weight ratio) of the polyvinyl alcohol-based resin (A) based on a total amount of the polyvinyl alcohol-based resin (A) and the polyvinyl alcohol-based resin (B), B represents a content ratio (weight ratio) of the polyvinyl alcohol-based resin (B) based on the above total amount, and G represents an amount (% by mol) of the 1,2-glycol bond at a side chain.

9 Claims, No Drawings

POLYVINYL ALCOHOL-BASED FILM FOR OPTICAL USE, POLARIZING FILM, AND POLARIZING PLATE

TECHNICAL FIELD

The present invention relates to a polyvinyl alcohol-based film for optical uses. More specifically, the invention relates to a polyvinyl alcohol-based film for optical uses, which is excellent in stretching property and is used for producing a polarizing film excellent in polarization performance throughout a visible light wavelength range, particularly in a vicinity of the wavelength of 460 nm.

BACKGROUND ART

Hitherto, a polyvinyl alcohol-based film has been produced by dissolving a polyvinyl alcohol-based resin in a solvent such as water to prepare a stock solution, subsequently forming a film by a solution-casting method (a casting method) and drying the film using a metal heating roll or the like. The polyvinyl alcohol-based film thus obtained has been utilized in a large number of applications as a film excellent in transparency, and a polarizing film is exemplified as one of useful applications thereof. Such a polarizing film has been used as an elemental constituent element of liquid crystal displays and in recent years, its use has been extended to equipments for which high definition and high reliability are required.

Under such circumstances, as brightness and fineness of the screen of a liquid crystal television or the like are heightened, there has been required a polarizing film more excellent in optical properties than conventional ones.

For such requirement, as polarizing films obtained as a result of improvement of a polyvinyl alcohol-based resin, there have been, for example, proposed a polarizing film using, as a base material, a uniaxially stretched film comprising a polyvinyl alcohol-based polymer wherein an amount of a 1,2-glycol bond directly bonded to the main chain is 1.8% by mol or more (see e.g., Patent Document 1), a polarizing film formed of a polyvinyl alcohol film comprising a vinyl alcohol-based polymer containing 0.01 to 20% by mol of a cationic group-containing unit and 0.5 to 24% by mol of an α-olefin unit having 4 or less carbon atoms (see e.g., Patent Document 2), and the like. Moreover, as a means of enhancing polarization performance in the vicinity of a wavelength of 400 to 500 nm, there has been proposed washing with an at least 0.8% aqueous potassium iodide solution in a washing step that is a production step of polarizing films (see e.g., Patent Document 3).

Patent Document 1: JP-A-8-136728
Patent Document 2: JP-A-2003-248123
Patent Document 3: JP-A-2004-341503

DISCLOSURE OF THE INVENTION

Technical Problem

However, in the technologies disclosed in the above Patent Documents 1 and 2, the polarizing films comprising the obtained polyvinyl alcohol-based films have an insufficient polarization performance in the vicinity of 460 nm that is a wavelength range of a visible light and hence there are problems that gradation display properties and contrast of liquid crystal displays are not enhanced, so that further improvement has been desired. Moreover, in the technology disclosed in Patent Document 3, although it is possible to enhance the polarization performance in the vicinity of 400 to 500 nm, the technology has a problem that foreign particles (optical defects) increase on the film since the film is washed with water in which inorganic matter is mixed.

In the invention, under such a background, an object is to provide a polyvinyl alcohol-based film for optical uses, which is excellent in stretching property and is used for producing a polarizing film excellent in polarization performance throughout the visible light wavelength range, particularly in the vicinity of the wavelength of 460 nm even under the production conditions of conventional polarizing films.

Technical Solution

As a result of the extensive studies for solving the above problems, the present inventors have found that a polyvinyl alcohol-based film which is excellent in stretching property and is used for producing a polarizing film excellent in polarization performance in the vicinity of the wavelength of 460 nm is obtained by the use of a polyvinyl alcohol-based resin (A) containing a 1,2-glycol bond at a side chain as a polyvinyl alcohol-based resin, preferably by the combined use of a polyvinyl alcohol-based resin (A) containing a 1,2-glycol bond at a side chain and a polyvinyl alcohol-based resin (B) other than the polyvinyl alcohol-based resin (A). Thus, they have accomplished the invention.

Namely, the gist of the invention relates to a polyvinyl alcohol-based film for optical uses comprising a polyvinyl alcohol-based resin, wherein the polyvinyl alcohol-based resin is composed of only a polyvinyl alcohol-based resin (A) containing a 1,2-glycol bond at a side chain and an amount of the 1,2-glycol bond at a side chain is from 0.01 to 6% by mol, or a polyvinyl alcohol-based film for optical uses comprising a polyvinyl alcohol-based resin, wherein the polyvinyl alcohol-based resin includes a polyvinyl alcohol-based resin (A) containing a 1,2-glycol bond at a side chain and a polyvinyl alcohol-based resin (B) other than the polyvinyl alcohol-based resin (A) and satisfies the following expression (1):

$$0.01 \leq A \times G/(A+B) \leq 6 \tag{1}$$

wherein A represents a content ratio (weight ratio) of the polyvinyl alcohol-based resin (A) based on a total amount of the polyvinyl alcohol-based resin (A) and the polyvinyl alcohol-based resin (B), B represents a content ratio (weight ratio) of the polyvinyl alcohol-based resin (B) based on the above total amount, and G represents an amount (% by mol) of the 1,2-glycol bond at a side chain.

Furthermore, in the invention, the content of the polyvinyl alcohol-based resin (A) containing a 1,2-glycol bond at a side chain is preferably 50% by weight or less based on the total amount of the polyvinyl alcohol-based resin (A) and the polyvinyl alcohol-based resin (B) other than the polyvinyl alcohol-based resin (A).

In the invention, it is preferred that the film further contains a plasticizer (C) and/or a surfactant (D).

Furthermore, in the invention, it is preferred that a width of the film is 2 m or more and a thickness of the film is 30 to 70 μm, respectively.

Moreover, the invention also provides a polarizing film comprising the above polyvinyl alcohol film for optical uses and further a polarizing plate comprising the polarizing film and a protective film provided on at least one surface of the polarizing film.

Advantageous of the Invention

The polyvinyl alcohol-based film for optical uses of the invention is a polyvinyl alcohol-based film excellent in stretching property and has an effect of obtaining a polarizing film excellent in polarization performance throughout the visible light wavelength range, particularly in the vicinity of the wavelength of 460 nm. The film is very useful as a raw film of polarizing films for use in polarizing sunglasses and liquid crystal display devices such as liquid crystal television, as a raw film for use in a ½ wavelength plate and a ¼ wavelength plate, and as a raw film of retardation films for use in liquid crystal display devices.

BEST MODE FOR CARRYING OUT THE INVENTION

The polyvinyl alcohol-based film for optical uses of the invention is a film wherein the used polyvinyl alcohol-based film composed of only a polyvinyl alcohol-based resin (A) containing a 1,2-glycol bond at a side chain and an amount of the 1,2-glycol bond at the side chain is from 0.01 to 6% by mol or a film comprising a polyvinyl alcohol-based resin (A) containing a 1,2-glycol bond at a side chain and a polyvinyl alcohol-based resin (B) other than the polyvinyl alcohol-based resin (A) and satisfies the above expression (1).

As the polyvinyl alcohol-based resin (A) for use in the invention, there may be mentioned a polyvinyl alcohol-based resin containing a 1,2-glycol bond at a side chain, i.e., usually a polyvinyl alcohol-based resin containing a 1,2-glycol structural unit represented by the general formula (1):

[Chem 1]

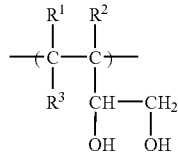

(1)

wherein $R^1$, $R^2$, and $R^3$ each independently represents a hydrogen atom or an alkyl group.

Such a polyvinyl alcohol-based resin (A) can be, for example, produced by (a) saponifying a copolymer of a vinyl ester-based monomer with 3,4-diacetoxy-1-butene.

As such a vinyl ester-based monomer, there may be mentioned vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate, vinyl versatate, and the like. In particular, vinyl acetate is preferably used.

3,4-Diacetoxy-1-butene to be copolymerized with such a vinyl ester-based monomer is represented by the following chemical formula (2):

[Chem 2]

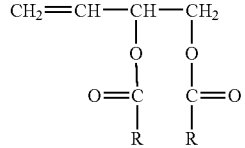

(2)

wherein R represents an alkyl group, preferably a methyl group.

In this connection, the compound represented by the above formula (2) is available as products of Eastman Chemical Company and Across Company or an intermediate at butane-diol production can be used after purification.

Moreover, in the invention, it is preferred to use the above copolymer but optionally, in addition to the above copolymerizable component, it is possible to copolymerize the other monomer in a small amount, e.g., 5% by mol or less within a range which does not inhibit the object of the invention. For example, there may be mentioned olefins such as ethylene, propylene, isobutylene, α-octene, α-dodecene, and α-octadecene; unsaturated acids such as acrylic acid, methacrylic acid, crotonic acid, maleic acid, maleic anhydride, and itaconic acid or salts or mono- or di-alkyl esters thereof; nitrites such as acrylonitrile and methacrylonitrile; amides such as diacetone acrylamide, acrylamide, and methacrylamide; olefin sulfonic acid such as ethylene sulfonic acid, allylsulfonic acid and methallylsulfonic acid or salts thereof; glycerin monoallyl ether, alkyl vinyl ethers, dimethylallyl vinyl ketone, N-vinylpyrrolidone, vinyl chloride, vinylidene chloride, polyoxyalkylene(meth)allyl ethers such as polyoxyethylene (meth)allyl ether and polyoxypropylene (meth)allyl ether; polyoxyalkylene (meth)acrylates such as polyoxyethylene (meth)acrylate and polyoxypropylene (meth)acrylate; polyoxyalkylene (meth)acrylamides such as polyoxyethylene (meth)acrylamide and polyoxypropylene (meth)acrylamide; polyoxyethylene(1-(meth)acrylamide-1,1-dimethylpropyl) ester, polyoxyethylene vinyl ether, polyoxypropylene vinyl ether, polyoxyethyleneallylamine, polyoxypropyleneallylamine, polyoxyethylenevinylamine, polyoxypropylenevinylamine, ethylene carbonate, allyl acetate, and the like.

Furthermore, there may be also mentioned cationic group-containing monomers such as N-acrylamidemethyltrimethylammonium chloride, N-acrylamideethyltrimethylammonium chloride, N-acrylamidepropyltrimethylammonium chloride, 2-acryloxyethyltrimethylammonium chloride, 2-methacryloxyethyltrimethylammonium chloride, 2-hydroxy-3-methacryloyloxypropyltrimethylammonium chloride, allyltrimethylammonium chloride, methallyltrimethylammonium chloride, 3-butenetrimethylammonium chloride, dimethyldiallylammonium chloride, diethyldiallylammonium chloride; acetoacetyl group-containing monomers; and the like.

In the copolymerization of the above vinyl ester-based monomer with 3,4-diacetoxy-1-butene (and further the other monomer), a method similar to known polymerization conditions and polymerization procedure for the vinyl ester-based monomer can be adopted.

As the polymerization procedure, a known method such as bulk polymerization, solution polymerization, suspension polymerization, dispersion polymerization, or emulsion polymerization can be adopted but usually, solution polymerization is carried out.

The method for adding the monomer components at the polymerization is not particularly limited and any method such as adding all at once, adding divisionally, or adding continuously may be adopted but dropping polymerization is preferred in view of physical properties of homogeneous distribution of 3,4-diacetoxy-1-butene in the molecular chain of the polyvinyl ester-based polymer, melting-point depression of polyvinyl alcohol, and the like, and particularly a polymerization process based on a HANNA process is preferred.

As a solvent for use in such copolymerization, there may be mentioned lower alcohols such as methanol, ethanol, propanol, and butanol; ketones such as acetone and methyl ethyl ketone; and the like, and industrially, methanol is suitably used.

The amount of the solvent to be used may be suitably selected in consideration of a chain transfer constant of the solvent in accordance to the degree of polymerization of the objective copolymer. For example, when the solvent is methanol, the amount is selected from the range of S (solvent)/M (monomer)=from 0.01 to 10 (weight ratio), preferably about 0.05 to about 3 (weight ratio).

At the copolymerization, a polymerization catalyst is used. As such a polymerization catalyst, there may be, for example, mentioned known radical polymerization catalysts such as azobisisobutyronitrile, acetyl peroxide, benzoyl peroxide, and lauryl peroxide; radical polymerization catalysts active at low temperature such as azobisdimethylvaleronitrile and azobismethoxydimethylvaleronitrile; and the like. The amount of the polymerization catalyst to be used varies depending on the kind of the catalyst and is not categorically determined but is optionally selected according to the polymerization rate. For example, in the case of using azoisobutyronitrile or acetyl peroxide, the amount is preferably from 0.01 to 0.2% by mol, particularly from 0.02 to 0.15% by mol based on the vinyl ester-based monomer.

Moreover, the reaction temperature of the copolymerization reaction is preferably about 40° C. to boiling point depending on the solvent and pressure used.

In the invention, the copolymerization ratio of 3,4-diacetoxy-1-butene is determined according to the introduced amount of the 1,2-glycol bond to be mentioned below.

The obtained copolymer is then saponified and the saponification reaction is basically the same as the saponification conditions for known polyvinyl alcohol-based resins. Namely, the copolymer obtained in the above is usually dissolved or dispersed in an alcohol or a water-containing alcohol and saponification is carried out using an alkali catalyst or an acid catalyst. As the alcohol, there may be mentioned methanol, ethanol, propanol, tert-butanol, and the like and methanol is particularly preferably used. The concentration of the copolymer in the alcohol is suitably selected depending on the viscosity of the system but usually is selected from the range of 10 to 60% by weight. As the catalyst for use in the saponification, there may be mentioned alkali catalysts including alkali metal hydroxides or alcoholates such as sodium hydroxide, potassium hydroxide, sodium methylate, sodium ethylate, potassium methylate, and lithium methylate; and acid catalysts such as sulfuric acid, hydrochloric acid, nitric acid, methanesulfonic acid, zeolite, and cation-exchange resins.

The amount of such a saponification catalyst to be used is suitably selected depending on the saponification method, a target degree of saponification, and the like but, in the case of using an alkali catalyst, usually, the amount is suitably from 0.1 to 30 mmol, preferably from 2 to 17 mmol per 1 mol of the total amount of the vinyl ester-based monomer and 3,4-diacetoxy-1-butene.

Moreover, the reaction temperature of the saponification reaction is not particularly limited but is preferably from 10 to 60° C., more preferably from 20 to 50° C.

The above polyvinyl alcohol-based resin (A) is produced by simultaneously converting the ester moiety of the vinyl ester-based monomer and the acetoxy moiety of 3,4-diacetoxy-1-butene into hydroxyl groups at the saponification as mentioned above.

Thus, the polyvinyl alcohol-based resin (A) containing a 1,2-glycol bond at a side chain is obtained. In the invention, it is preferred that the degree of saponification of the polyvinyl alcohol-based resin (A) is usually 90% by mol or more, particularly 95% by mol or more, further 98% by mol or more. When the degree of saponification is too small, water resistance at the preparation of a polarizing film tends to be insufficient.

In this connection, the degree of saponification in the invention is represented by a conversion rate (% by mol) of the total amount of the ester moiety of the vinyl ester-based monomer and the acetoxy moiety of 3,4-diacetoxy-1-butene into hydroxyl groups (in the saponification reaction, the acetoxy moiety of 3,4-diacetoxy-1-butene is almost completely saponified).

Moreover, it is preferred that the viscosity of the above polyvinyl alcohol-based resin (A) is, as a viscosity of a 4% by weight aqueous solution, usually from 8 to 400 mPa·s, particularly from 40 to 300 mPa·s, further from 50 to 270 mPa·s in the case where at least one kinds selected from the group consisting of only the polyvinyl alcohol-based resins (A) is used. When such viscosity of the 4% by weight aqueous solution is too small, stretching property at the preparation of a polarizing film tends to be insufficient, while when the viscosity is too large, surface smoothness and transparency of the film tends to decrease. Also, it is preferred that the viscosity of the polyvinyl alcohol-based resin (A) is, as a viscosity of a 4% by weight aqueous solution, usually from 8 to 400 mPa·s, particularly from 12 to 300 mPa·s, further from 16 to 270 mPa·s in the case where the polyvinyl alcohol-based resins (A) and the polyvinyl alcohol-based resin (B) are used in combination. When the viscosity of the 4% by weight aqueous solution is too small, stretching property at the preparation of a polarizing film tends to be insufficient, while when the viscosity is too large, surface smoothness and transparency of the film tend to decrease.

Furthermore, the amount of the 1,2-glycol bond to be introduced into the side chain of the polyvinyl alcohol-based resin (A) is 0.01 to 6% by mol, preferably 0.05 to 4% by mol, particularly preferably 0.1 to 3% by mol in the case where at least one kinds selected from the group consisting of only the polyvinyl alcohol-based resins (A) is used. When the amount is less than the lower limit, the advantages of the invention are not obtained, while when the amount exceeds the upper limit, water resistance at the preparation of a polarizing film becomes insufficient. Also, the amount of the 1,2-glycol bond to be introduced into the side chain of the polyvinyl alcohol-based resin (A) is from 0.01 to 20% by mol, preferably 0.05 to 15% by mol, particularly preferably 0.1 to 12% by mol in the case where the polyvinyl alcohol-based resins (A) and the polyvinyl alcohol-based resin (B) are used in combination. When the amount is too small, the advantages of the invention are hardly obtained, while when the amount is too large, the production of the polyvinyl alcohol-based resin tends to be difficult.

Moreover, as the process for producing the polyvinyl alcohol-based resin (A) for use in the invention, (a) the above process of saponifying the copolymer of the above vinyl ester-based monomer with 3,4-diacetoxy-1-butene is described in detail. However, the process is not limited thereto and there may be mentioned, for example, (b) a process of saponifying and decarboxylating a copolymer of the vinyl ester-based monomer with a vinylethylene carbonate represented by the general formula (3), (c) a process of saponifying a copolymer of the vinyl ester-based monomer with a 2,2-dialkyl-4-vinyl-1,3-dioxolane represented by the general formula (4) and performing solvolysis of the ketal structure, (d) a process of saponifying a copolymer of the vinyl ester-based monomer with glycerin monoallyl ether, and the like without limitation. In this connection, the vinylethylene carbonate is commercially available as a commercial product (e.g., a product of Eastman Chemical Company).

[Chem 3]

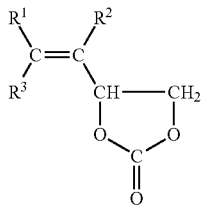

(3)

wherein $R^1$, $R^2$, and $R^3$ each independently represents a hydrogen atom or an alkyl group.

[Chem 4]

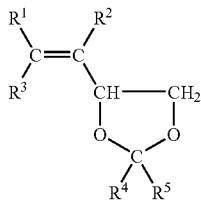

(4)

wherein $R^1$, $R^2$, $R^3$, $R^4$, and $R^5$ each independently represents a hydrogen atom or an alkyl group.

In the invention, as mentioned above, in the case where the polyvinyl alcohol-based resin is composed of only the polyvinyl alcohol-based resin (A), excellent adequacy is exhibited as an optical film. However, in the invention, it is more preferred to use the above polyvinyl alcohol-based resin (A) and further the above polyvinyl alcohol-based resin (B) other than the polyvinyl alcohol-based resin (A) in combination in view of further enhancement of stretching property and dyeing property.

In the invention, as the polyvinyl alcohol-based resin (A), polyvinyl alcohol-based resins different in the amount of the 1,2-glycol bond, the degree of saponification, viscosity of the 4% by weight aqueous solution, and the like may be used in combination.

As the polyvinyl alcohol-based resin (B) for use in the invention is not particularly limited but usually, the degree of saponification is preferably 90% by mol or more, particularly preferably 95% by mol or more, further preferably 98% by mol or more. When the degree of saponification is too small, water resistance at the preparation of a polarizing film tends to be insufficient.

Furthermore, it is preferred that the viscosity of the polyvinyl alcohol-based resin (B) is, as a viscosity of a 4% by weight aqueous solution, usually from 8 to 500 mPa·s, particularly from 20 to 400 mPa·s, further from 40 to 400 mPa·s. When the viscosity of the 4% by weight aqueous solution is too small, stretching property at the preparation of a polarizing film tends to be insufficient, while when the viscosity is too large, surface smoothness and transparency of the film tends to decrease.

The polyvinyl alcohol-based resin (B) is not particularly limited so far as it is a polyvinyl alcohol-based resin other than the polyvinyl alcohol-based resin (A) but usually, is preferably an unmodified polyvinyl alcohol-based resin.

Also, it may be a polyvinyl alcohol-based resin which contains a small amount of a component copolymerizable with vinyl acetate, such as an unsaturated carboxylic acid (including a salt, an ester, an amide, or a nitrile), olefins having 2 to 30 carbon atoms (ethylene, propylene, n-butene, isobutene, etc.), vinyl ethers, an unsaturated sulfonate salt, or the like.

Moreover, as the polyvinyl alcohol-based resin (B), polyvinyl alcohol-based resins different in the amount of the degree of saponification, viscosity of the 4% by weight aqueous solution, and the like may be used in combination.

In the invention, when the polyvinyl alcohol-based resin (A) and the polyvinyl alcohol-based resin (B) are contained, the polyvinyl alcohol-based resin preferably satisfies the following expression (1), particularly satisfies the following expression (2), and further preferably satisfies the following expression (3).

$$0.01 \leq A \times G/(A+B) \leq 6 \quad (1)$$

$$0.05 \leq A \times G/(A+B) \leq 4 \quad (2)$$

$$0.1 \leq A \times G/(A+B) \leq 2 \quad (3)$$

wherein A represents a content ratio (weight ratio) of the polyvinyl alcohol-based resin (A) based on a total amount of the polyvinyl alcohol-based resin (A) and the polyvinyl alcohol-based resin (B), B represents a content ratio (weight ratio) of the polyvinyl alcohol-based resin (B) based on the above total amount, and G represents an amount (% by mol) of the 1,2-glycol bond at a side chain.

In the above formula (1), when the value is less than the lower limit, the advantages of the invention are hardly obtained, while when the value exceeds the upper limit, water resistance at the preparation of a polarizing film tends to be insufficient.

In the invention, the content of the polyvinyl alcohol-based resin (A) containing a 1,2-glycol bond at a side chain is preferably 50% by weight or less based on the total amount of the polyvinyl alcohol-based resin (A) and the polyvinyl alcohol-based resin (B) other than the polyvinyl alcohol-based resin (A) in view of stretching property and optical performance, and the content is particularly preferably 5 to 50% by weight, further preferably 10 to 40% by weight. When the content of the polyvinyl alcohol-based resin (A) is too small, an excellent polarization performance in the vicinity of a wavelength of 460 nm tends to be hardly obtained, while when the content is too large, stretching property tends to decrease at the preparation of a polarizing film.

Moreover, when the polyvinyl alcohol-based resin (A) and the polyvinyl alcohol-based resin (B) are contained, the difference in the degree of saponification between the polyvinyl alcohol-based resin (A) and the polyvinyl alcohol-based resin (B) is preferably 6% by mol or less in view of transparency of the film and particularly preferred is 3% by mol or less. When the difference in the degree of saponification is too large, the transmittance of the film tends to decrease.

Furthermore, in the invention, in addition to the polyvinyl alcohol-based resin (A) and the polyvinyl alcohol-based resin (B), it is preferred that a plasticizer (C) and a surfactant (D) are contained.

The plasticizer (C) for use in the invention contributes stretching property at the preparation of a polarizing film and, for example, there may be mentioned polyhydric alcohols such as ethylene glycol, glycerin, propylene glycol, diethylene glycol, diglycerin, triethylene glycol, tetraethylene glycol, trimethylolpropane, and polyethylene glycol having a degree of polymerization of 300 or less. These polyhydric alcohols may be used singly or as a combination of two or more thereof. Of these, particularly preferably, there may be mentioned glycerin alone or a combination of glycerin and diglycerin, glycerin and trimethylolpropane, or the like.

The content of the plasticizer (C) is preferably 1 to 35 parts by weight, particularly preferably 3 to 30 parts by weight, further preferably 7 to 25 parts by weight based on 100 parts by weight of the total polyvinyl alcohol-based resin used. When the content of the plasticizer (C) is too small, stretching property at the preparation of a polarizing film tends to decrease, while when the content is too large, stability with time of the polyvinyl alcohol-based film for optical uses obtained tends to decrease.

Moreover, the surfactant (D) for use in the invention has a function of effecting the smoothness of the film surface and suppressing the attachment of films each other at the rolling-up in a roll form. For example, anionic surfactants and nonionic surfactants can be used singly or as a combination of two or more thereof but, in particular, the combined use of an anionic surfactant and a nonionic surfactant is preferred in view of transparency of the film.

As the anionic surfactant, there may be, for example, mentioned:
(1) aliphatic alkylsulfonate salts,
(2) alkyl sulfate ester salts,
(3) polyoxyethylene alkyl ether sulfate salts,
(4) polyoxyethylene alkylphenyl ether sulfate salts,
(5) higher fatty acid alkanolamide sulfate salts, and the like.

(1) As specific examples of the aliphatic alkylsulfonate salts, there may be, for example, mentioned sodium hexylsulfonate, sodium heptylsulfonate, sodium octylsulfonate, sodium nonylsulfonate, sodium decylsulfonate, sodium dodecylsulfonate, sodium tetradecylsulfonate, sodium hexadecylsulfonate, sodium octadecylsulfonate, a mixture of sodium aliphatic alkylsulfonates having 6 to 18 carbon atoms, and the like. Suitably, sodium dodecylsulfonate, sodium tetradecylsulfonate, sodium hexadecylsulfonate, a mixture of sodium secondary alkylsulfonates having 10 to 18 carbon atoms, or the like is used. Moreover, a counter cation of the aliphatic alkylsulfonate salt is not particularly limited and there may be mentioned $Na^+$, $Ca^{2+}$, $NH_4^+$, or a mixture thereof. Of these, $Na^+$ is particularly preferred.

(2) As specific examples of the alkyl sulfate ester salts, there may be, for example, mentioned alkali metal salts such as sodium hexyl sulfate, sodium heptyl sulfate, sodium octyl sulfate, sodium nonyl sulfate, sodium decyl sulfate, sodium dodecyl sulfate, sodium tetradecyl sulfate, sodium hexadecyl sulfate, sodium octadecyl sulfate, sodium eicosyl sulfate, or potassium salts thereof; alkaline earth metal salts such as calcium salts; and organic amine salts such as ammonium salts. Suitably, sodium dodecyl sulfate, sodium octadecyl sulfate, or the like is used. Moreover, a counter cation is not particularly limited and there may be mentioned $Na^+$, $Ca^{2+}$, $NH_4^+$, or a mixture thereof. Of these, $Na^+$ is particularly preferred.

(3) As specific examples of the polyoxyethylene alkyl ether sulfate salts, there may be, for example, mentioned alkali metal salts such as sodium polyoxyethylene hexyl ether sulfate, sodium polyoxyethylene heptyl ether sulfate, sodium polyoxyethylene octyl ether sulfate, sodium polyoxyethylene nonyl ether sulfate, sodium polyoxyethylene decyl ether sulfate, sodium polyoxyethylene dodecyl ether sulfate, sodium polyoxyethylene tetradecyl ether sulfate, sodium polyoxyethylene hexadecyl ether sulfate, sodium polyoxyethylene octadecyl ether sulfate, sodium polyoxyethylene eicosyl ether sulfate, or potassium salts thereof; and organic amine salts such as ammonium salts. Suitably, sodium polyoxyethylene dodecyl ether sulfate or the like is used. Moreover, a counter cation is not particularly limited and there may be mentioned Na, $Ca^{2+}$, $NH_4^+$, or a mixture thereof. Of these, $Na^+$ is particularly preferred.

(4) As specific examples of the polyoxyethylene alkylphenyl ether sulfate salts, there may be, for example, mentioned alkali metal salts such as sodium polyoxyethylene hexylphenyl ether sulfate, sodium polyoxyethylene heptylphenyl ether sulfate, sodium polyoxyethylene octylphenyl ether sulfate, sodium polyoxyethylene nonylphenyl ether sulfate, sodium polyoxyethylene decylphenyl ether sulfate, sodium polyoxyethylene dodecylphenyl ether sulfate, sodium polyoxyethylene tetradecylphenyl ether sulfate, sodium polyoxyethylene hexadecylphenyl ether sulfate, sodium polyoxyethylene octadecylphenyl ether sulfate, sodium polyoxyethylene eicosylphenyl ether sulfate, or potassium salts thereof; and organic amine salts such as ammonium salts. Suitably, sodium polyoxyethylene nonylphenyl ether sulfate or the like is used. Moreover, a counter cation is not particularly limited and there may be mentioned $Na^{4+}$, $Ca^{2+}$, $NH_4^+$, or a mixture thereof. Of these, $Na^+$ is particularly preferred.

(5) As specific examples of the higher fatty acid alkanolamide sulfate salts, there may be, for example, mentioned sodium caproic ethanolamide sulfate, sodium caprylic ethanolamide sulfate, sodium capric ethanolamide sulfate, sodium lauric ethanolamide sulfate, sodium palmitic ethanolamide sulfate, sodium stearic ethanolamide sulfate, sodium oleic ethanolamide sulfate, or potassium salts thereof; and propanolamides and butanolamides thereof instead of these ethanolamides. Moreover, a counter cation is not particularly limited and there may be mentioned Na, $Ca^{2+}$, $NH_4^+$, or a mixture thereof. Of these, $Na^+$ is particularly preferred.

Moreover, in addition to the anionic surfactants of the above (1) to (5), anionic surfactants including sulfate ester salts such as sulfated oil, higher alcohol ethoxy sulfates, and monoglysulfates, carboxylate salt types such as fatty acid soaps, N-acylamino acids and salts thereof, polyoxyethylene-alkyl ester carboxylate salts, and acylated peptides, sulfonate salt types such as alkylbenzenesulfonate salts, alkylnaphthalenesulfonate salts, naphthalenesulfonates & formaldehyde polycondensation, melaminesulfonates & formaldehyde polycondensation, dialkyl sulfosuccinate ester salts, alkyl sulfosuccinate di-salts, polyoxyethylenealkyl sulfosuccinate di-salts, alkyl sulfoacetate salts, α-olefinsulfonate salts, N-acylmethyltaurine salts, and dimethyl-5-sulfoisophthalate sodium salt, phosphate ester salt types such as polyoxyethylene alkyl ether phosphate salts, polyoxyethylene alkylphenyl ether phosphate salts, and alkyl phosphate salts, and the like may be used in combination.

On the other hand, as nonionic surfactants, there may be, for example, mentioned:
(7) polyoxyethylene alkyl ethers represented by the general formula:

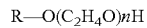

wherein R represents an alkyl group or an alkenyl group and the number of carbon atoms thereof is 6 to 22, preferably 8 to 18; they may be a single alkyl group or mixed alkyl groups; and alkyl groups having an alkyl distribution obtainable from coconut oil, palm oil, palm kernel oil, beef tallow, or the like can be used;
(8) polyoxyethylene alkylphenyl ethers represented by the general formula:

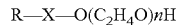

wherein R represents an alkyl group or an alkenyl group and the number of carbon atoms thereof is 6 to 22, preferably 8 to 18; they may be a single alkyl group or mixed alkyl groups;

alkyl groups having an alkyl distribution obtainable from coconut oil, palm oil, palm kernel oil, beef tallow, or the like can be used; and X represents a phenylene group and n represents an integer of 1 to 20, preferably 2 to 10;

(9) higher fatty acid mono- or di-alkanolamides represented by the general formula:

RCONH—R'—OH or RCON—(R'—OH)$_2$ wherein R represents an alkyl group or an alkenyl group and the number of carbon atoms thereof is 6 to 22, preferably 8 to 18; they may be a single alkyl group or mixed alkyl groups; alkyl groups having an alkyl distribution obtainable from coconut oil, palm oil, palm kernel oil, beef tallow, or the like can be used; and R' represents any of —C$_2$H$_4$—, —C$_3$H$_6$—, and —C$_4$H$_8$—;

(10) higher fatty acid amides represented by the general formula:

RCONH$_2$ wherein R represents an alkyl group or an alkenyl group and the number of carbon atoms thereof is 6 to 22, preferably 8 to 18; they may be a single alkyl group or mixed alkyl groups; and alkyl groups having an alkyl distribution obtainable from coconut oil, palm oil, palm kernel oil, beef tallow, or the like can be used;

(11) polyoxyethylenealkylamines represented by the general formula:

RNH(C$_2$H$_4$O)$x$H or H(C$_2$H$_4$O)$y$N(R)(C$_2$H$_4$O)$x$H wherein R represents an alkyl group and the number of carbon atoms thereof is 6 to 22, preferably 8 to 18; they may be a single alkyl group or mixed alkyl groups; alkyl groups having an alkyl distribution obtainable from coconut oil, palm oil, palm kernel oil, beef tallow, or the like can be used; and x and y each represents an integer of 1 to 30, preferably 3 to 15;

(12) polyoxyethylene higher fatty acid amides;

(13) amine oxides;

and the like.

(7) As specific examples of the polyoxyethylene alkyl ethers, there may be, for example, mentioned polyoxyethylene hexyl ether, polyoxyethylene heptyl ether, polyoxyethylene octyl ether, polyoxyethylene nonyl ether, polyoxyethylene decyl ether, polyoxyethylene dodecyl ether, polyoxyethylene tetradecyl ether, polyoxyethylene hexadecyl ether, polyoxyethylene octadecyl ether, polyoxyethylene oleyl ether, polyoxyethylene eicosyl ether, and the like. Particularly, polyoxyethylene dodecyl ether, polyoxyethylene octadecyl ether, or the like is suitable.

(8) As specific examples of the polyoxyethylene alkylphenyl ethers, there may be, for example, mentioned polyoxyethylene hexylphenyl ether, polyoxyethylene heptylphenyl ether, polyoxyethylene octylphenyl ether, polyoxyethylene nonylphenyl ether, polyoxyethylene decylphenyl ether, polyoxyethylene dodecylphenyl ether, polyoxyethylene tetradecylphenyl ether, polyoxyethylene hexadecylphenyl ether, polyoxyethylene octadecylphenyl ether, polyoxyethylene eicosylphenyl ether, and the like. Particularly, polyoxyethylene nonylphenyl ether is suitable.

(9) As specific examples of the higher fatty acid mono- or di-alkanolamides, there may be, for example, mentioned caproic acid mono- or di-ethanolamide, caprylic acid mono- or di-ethanolamide, capric acid mono- or di-ethanolamide, lauric acid mono- or di-ethanolamide, palmitic acid mono- or di-ethanolamide, stearic acid mono- or di-ethanolamide, oleic acid mono- or di-ethanolamide, coconut oil fatty acid mono- or di-ethanolamide, or propanolamides and butanolamides thereof instead of these ethanolamides. Of these, alkyldiethanolamides are preferred and specifically, lauric diethanolamide or coconut oil fatty acid diethanolamide is suitably used. In particular, the use of a mixture (1:2 mol type) of the diethanolamide and adduct of the diethanolamide and diethanolamine [NH—(C$_2$H$_4$OH)$_2$] produced as a by-product in the production process is advantageous in view of water solubility.

(10) As specific examples of the higher fatty acid amides, there may be, for example, mentioned caproic amides, caprylic amides, capric amides, lauric amides, palmitic amides, stearic amides, oleic amides, and the like. Of these, palmitic amides and stearic amides are suitable.

(11) As specific examples of the polyoxyethylenealkylamines, there may be, for example, mentioned polyoxyethylenehexylamine, polyoxyethyleneheptylamine, polyoxyethyleneoctylamine, polyoxyethylenenonylamine, polyoxyethylenedecylamine, polyoxyethylenedodecylamine, polyoxyethylenetetradecylamine, polyoxyethylenehexadecylamine, polyoxyethyleneoctadecylamine, polyoxyethyleneeicosylamine, and the like. Of these, polyoxyethylenedodecylamine is suitable.

(12) As specific examples of the polyoxyethylene higher fatty acid amides, there may be, for example, mentioned polyoxyethylene caproic amides, polyoxyethylene caprylic amides, polyoxyethylene capric amides, polyoxyethylene lauric amides, polyoxyethylene myristic amides, polyoxyethylene palmitic amides, polyoxyethylene stearic amides, polyoxyethylene oleic amides, and the like. Of these, polyoxyethylene lauric amides and polyoxyethylene stearic amides are suitable.

(13) As specific examples of the amine oxides, there may be, for example, mentioned dimethyllaurylamine oxide, dimethylstearyl oxide, dihydroxyethyllaurylamine oxide, and the like. Of these, dimethyllaurylamine oxide is suitable.

Moreover, in addition to the above nonionic surfactants (7) to (13), ethylene oxide derivatives of alkylphenol-formalin condensates, polyoxyethylene-polyoxypropylene block polymers, ether ester type nonionic surfactants such as polyoxyethylene glycerin fatty acid esters, polyoxyethylene castor oil and hardened castor oil, polyoxyethylene sorbitan fatty acid esters, and polyoxyethylene sorbitol fatty acid esters, and ester type surfactants such as polyethylene glycol fatty acid esters, sorbitan fatty acid esters, fatty acid monoglycerides, propylene glycol fatty acid esters, and sucrose fatty acid esters can be used in combination.

The content of the surfactant (D) is preferably 0.01 to 1 part by weight, particularly preferably 0.02 to 0.5 part by weight, further preferably 0.03 to 0.2 part by weight based on 100 parts by weight of the total polyvinyl alcohol-based resin used. When the content of the surfactant (D) is too small, an antiblocking effect is hardly obtained, while when the content is too large, the transparency of the film tends to decrease.

Moreover, in the case where an anionic surfactant and a nonionic surfactant are used in combination, the amount of the anionic surfactant is preferably 0.01 to 1 part by weight, particularly preferably 0.02 to 0.2 part by weight, further preferably 0.02 to 0.1 part by weight and the amount of the nonionic surfactant is preferably 0.01 to 1 part by weight, particularly preferably 0.02 to 0.2 part by weight, further preferably 0.03 to 0.1 part by weight based on 100 parts by weight of the total polyvinyl alcohol-based resin used. When the amount of the anionic surfactant is too small, there is a tendency that the dispersibility of dyes at the preparation of a polarizing film decreases and dyeing speckles increase, while when the amount is too large, there is a tendency that the foaming at dissolution of the polyvinyl alcohol-based resin is violent, air bubbles are apt to be mixed into the film, and hence the film cannot be used as an optical film. When the amount of the nonionic surfactant is too small, the antiblocking effect is hardly obtained, while when the amount is too large, transparency and surface smoothness of the film tends to decrease.

In the invention, in order to prevent yellowing of the film, it is also useful to mix an antioxidant. Any antioxidants such as phenolic antioxidants are exemplified and 2,6-di-t-butyl-p-cresol, 2,2'-methylenebis(4-methyl-6-t-butylphenol), 4,4'-butylidenebis(3-methyl-6-t-butylphenol), and the like are suitable. The antioxidant is used in the range of about 2 to 100 ppm based on the polyvinyl alcohol-based resin.

Thus, in the invention, a polyvinyl alcohol-based film is formed using the above polyvinyl alcohol-based resin (A) containing the 1,2-glycol bond at the side chain or the polyvinyl alcohol-based resin (A) containing a 1,2-glycol bond at a side chain and the polyvinyl alcohol-based resin (B) other than the polyvinyl alcohol-based resin (A), and preferably further the plasticizer (C) and/or the surfactant (D).

The following will specifically describe the process for producing the polyvinyl alcohol-based film of the invention. In this connection, when the polyvinyl alcohol-based resin (A) and the polyvinyl alcohol-based resin (B) are collectively expressed, they are sometimes referred to as "a polyvinyl alcohol-based resin".

In the invention, an aqueous solution of the polyvinyl alcohol-based resin composition is prepared using the polyvinyl alcohol-based resin (A) containing a 1,2-glycol bond at a side chain or the polyvinyl alcohol-based resin (A) containing a 1,2-glycol bond at a side chain and the polyvinyl alcohol-based resin (B) other than the polyvinyl alcohol-based resin (A), and preferably further the plasticizer (C) and/or the surfactant (D) and a film is formed by casting the aqueous solution on a drum roll or an endless belt and drying the film, thereby the polyvinyl alcohol film being produced.

In the production process of the invention, the polyvinyl alcohol-based resin powder is first washed in order to remove sodium acetate usually incorporated in the resin. In the washing, the powder is washed with methanol or water but a method of washing with water is more preferred since a method of washing with methanol requires solvent recovery or the like.

Then, a wet cake of the water-containing polyvinyl alcohol-based resin after the washing is dissolved to prepare an aqueous solution of the polyvinyl alcohol-based resin. Since a desired aqueous solution having a high concentration is not obtained when the wet cake of the water-containing polyvinyl alcohol-based resin is directly dissolved in water, it is preferred to subject it to water removal. The method of the water removal is not particularly limited but a method utilizing centrifugal force is commonly used.

It is preferred to obtain a wet cake of the water-containing polyvinyl alcohol-based resin having a water content of 50% by weight or less, preferably 30 to 45% by weight by the above washing and water removal. When the water content is too large, it tends to be difficult to adjust the aqueous solution to a desired concentration.

Then, the aqueous solution of the polyvinyl alcohol-based resin composition for use in the film formation of the polyvinyl alcohol-based film is prepared by adding water, the aforementioned wet cake of the water-containing polyvinyl alcohol-based resin, the plasticizer (C), the surfactant (D), and the like into a dissolution tank and heating and stirring the whole to effect dissolution. In the production process of the invention, particularly, it is preferred to dissolve the wet cake of the water-containing polyvinyl alcohol-based resin in the dissolution tank fitted with vertically circulating flow type mixing impellers by introducing steam therein from the viewpoint of solubility.

When the wet cake of the water-containing polyvinyl alcohol-based resin is dissolved in the dissolution tank fitted with vertically circulating flow type mixing impellers by introducing steam therein, it is preferred to start stirring at the time when the resin temperature reaches 40 to 80° C., preferably 45 to 70° C. by introducing steam therein in view of capability of homogeneous dissolution. When the resin temperature is too low, a load on a motor becomes large, while the temperature is too high, homogeneous dissolution tends to be impossible since lumps of the polyvinyl alcohol-based resin are formed. Furthermore, it is also preferred to pressurize the inside of the can at the time when the resin temperature reaches 90 to 100° C., preferably 95 to 100° C. by introducing steam therein in view of capability of homogeneous dissolution. When the resin temperature is too low, insoluble matter tends to be formed. When the resin temperature reaches 130 to 150° C., the introduction of steam is terminated and stirring is continued for 0.5 to 3 hours to effect dissolution. After dissolution, concentration adjustment is performed so as to achieve a desired concentration.

The concentration of the thus obtained aqueous solution of the polyvinyl alcohol-based resin composition is preferably from 10 to 50% by weight, further preferably from 15 to 40% by weight, particularly preferably from 20 to 30% by weight. When the concentration of the aqueous solution is too small, there is a tendency that a drying load becomes large and production capacity is poor, while when the concentration is too large, viscosity becomes too high and homogeneous dissolution is hardly achieved.

Then, the resulting aqueous solution of the polyvinyl alcohol-based resin composition is subjected to a defoaming treatment. As the defoaming method, there may be mentioned defoaming on standing, defoaming by means of a multi-screw extruder, and the like. In the production process of the invention, the method of defoaming by means of a multi-screw extruder is preferred in view of productivity.

After the defoaming treatment is performed, the aqueous solution of the polyvinyl alcohol-based resin composition discharged from the multi-screw extruder is introduced into a T-form slit die by a specific amount. Thereafter, the aqueous solution is cast on a drum roll or an endless belt and a film is formed and dried.

As the T-form slit die, an elongated rectangular T-form slit die is usually employed. The resin temperature at the outlet of the T-form slit die is preferably from 80 to 100° C., more preferably from 85 to 98° C. When the resin temperature at the outlet of the T-form slit die is too low, flowability is insufficient. When the temperature is too high, bubbles tend to form.

At the casting, a drum roll or an endless belt is used but a drum roll is preferably used in view of widening and lengthening, uniformity of film thickness, and the like.

At the casting and film formation on the drum roll, for example, the rotation rate of the drum roll is preferably from 5 to 30 m/minute, particularly preferably from 6 to 20 m/minutes. The surface temperature of the drum roll is preferably from 70 to 99° C., more preferably from 75 to 97° C. When the surface temperature of the drum roll is too low, drying is insufficient. When the temperature is too high, bubbles tend to form.

The polyvinyl alcohol film after formed on the drum roll is dried with passing the front side and backside thereof through a plurality of drying rolls alternately. The surface temperature of the drying rolls is not particularly limited but is preferably from 60 to 100° C., further preferably from 65 to 90° C. When the surface temperature is too low, drying is insufficient, while when the temperature is too high, drying proceeds excessively and defective appearance tends to be invited. Moreover, in the invention, it is preferred to perform a thermal treatment after drying.

With regard to the thermal treatment, there may be mentioned (1) a method of passing the film through roll(s) (1 to 30 rolls) having a diameter of 0.2 to 2 m whose surface has been subjected to a hard chrome plating treatment or a mirror-finishing treatment and which is adjusted to a temperature of 60 to 180° C., (2) a method with a floating type drier (length: 2 to 30 m, temperature: 80 to 180° C.), and the like method.

The thus obtained polyvinyl alcohol-based film of the invention has a light transmittance of 90% or more throughout the visible light wavelength range and is very useful as a polyvinyl alcohol-based film for optical uses. Therefore, the polyvinyl alcohol-based film for optical uses of the invention is preferably used as a raw film for polarizing films.

The following will describe a process for producing the polarizing film of the invention using the polyvinyl alcohol film for optical uses of the invention.

The polarizing film of the invention is produced via steps of usual dyeing, stretching, crosslinking with boric acid, and thermal treatment. As a process for producing the polarizing film, there are a method of stretching of the polyvinyl alcohol-based film, dyeing by dipping it in a solution of iodine or a dichroic dye, and subsequent treatment with a boron compound, a method of simultaneous stretching and dyeing and subsequent treatment with a boron compound, a method of dyeing with iodine or a dichroic dye, stretching, and subsequent treatment with a boron compound, a method of dyeing and subsequent stretching in a solution of a boron compound, and the like method, which can be suitably selected and used. Thus, the polyvinyl alcohol-based film (unstretched film) may be subjected to stretching, dyeing, and further treatment with a boron compound separately or simultaneously. However, in view of productivity, it is desirable to carry out uniaxial stretching during at least one step of the dyeing step and the step of treatment with a boron compound.

The stretching is desirably conducted at a magnification of preferably 3 to 10 times, further preferably 3.5 to 7 times in a uniaxial direction. On this occasion, it is also possible to slightly stretch in a direction perpendicular to the stretching direction (stretching of a degree so as to prevent shrinkage in a width direction or more degree). The temperature at stretching is desirably selected from 20 to 170° C. Furthermore, stretching magnification may be finally set within the above range and the stretching operation may be carried out not only at one stage but also at any range of stages in the production steps.

The dyeing of the film is generally carried out by bringing the film into contact with a liquid containing iodine or a dichroic dye. Usually, an aqueous solution of iodine-potassium iodide is used and it is preferable that concentration of iodine is from 0.1 to 2 g/L, concentration of potassium iodide is from 10 to 50 g/L, a weight ratio of potassium iodide/iodine is from 20 to 100. Dyeing time is practically from about 30 to 500 seconds. Temperature of the treating bath is preferably from 5 to 50° C. In addition to water solvent, it is possible to incorporate a small amount of an organic solvent compatible with water. As a means for the contact, any means such as dipping, applying, and spraying can be applied.

The film subjected to the dyeing treatment is then treated with a boron compound. As the boron compound, boric acid or borax is practical. The boron compound is preferably used in a form of an aqueous solution or a mixed solution of water-organic solvent in a concentration of about 0.3 to 2 mol/L. In the solution, coexistence of a small amount of potassium iodide is practically desirable. A dipping method is desirable as the treating method but an applying method or a spraying method is also practicable. Temperature at the treatment is preferably about 20 to 60° C. and treating time is preferably from about 3 to 20 minutes. Moreover, if necessary, a stretching operation may be conducted during the treatment.

The polarizing film of the invention thus obtained can be used as a polarizing plate after laminating and adhering an optically isotropic polymer film or sheet as a protective film on one surface or both surfaces thereof. As the protective film for use in the polarizing plate of the invention, there may be, for example, mentioned a film or sheet of cellulose triacetate, cellulose diacetate, polycarbonate, polymethyl methacrylate, polystyrene, a polyether sulfone, a polyarylene ester, poly-4-methylpentene, polyphenylene oxide, a cyclo-based polyolefin or a norbornene-based polyolefin, or the like.

Moreover, onto the polarizing film, for the purpose of thinning the film, instead of the above protective film, it is also possible to apply a curable resin such as a urethane-based resin, an acrylic resin, or a urea resin on one surface or both surfaces thereof to effect lamination.

The polarizing film (inclusive of the film having a protective film or a curable resin laminated on at least one surface) is sometimes put into a practical use after formation of a transparent pressure-sensitive adhesive layer on one surface thereof, if necessary, by a method commonly known. As the pressure-sensitive adhesive layer, particularly preferred is one mainly comprising a copolymer of an acrylate ester such as butyl acrylate, ethyl acrylate, methyl acrylate, or 2-ethylhexyl acrylate with an α-monoolefinic carboxylic acid such as acrylic acid, maleic acid, itaconic acid, methacrylic acid, or crotonic acid (inclusive of a copolymer wherein a vinyl monomer such as acrylonitrile, vinyl acetate, or styrol is added) since polarizing properties of the polarizing film are not inhibited. However, any pressure-sensitive adhesive having transparency can be used without limitation thereto and polyvinyl ether-based one or rubber-based one may be used.

The polarizing film of the invention is preferably used in electronic desk calculators, electronic clocks or watches, word processors, personal computers, televisions, handy information terminals, liquid crystal display devices such as instruments for automobiles and machines, sunglasses, eye-protective glasses, 3D glasses, reflection-reducing layers for display devices (CRT, LCD, etc.), medical equipments, building materials, toys, and the like.

EXAMPLES

The following will specifically describe the invention with reference to Examples but the invention is not limited to these Examples unless it exceeds the gist.

In Examples, "part(s)" and "%" mean those on the weight basis, respectively, unless otherwise noted.

Each physical property is measured as follows.
(1) Amount of 1,2-glycol Bond at Side Chain
  It was determined through measurement on $^1$H-NMR
  (internal standard substance: tetramethylsilane, solvent: d6-DMSO) and calculation.
(2) Degree of Saponification of Polyvinyl Alcohol-Based Resin
  It was analyzed by alkali consumption required for hydrolysis of remaining vinyl acetate unit.

(3) Viscosity of 4% Aqueous Solution of Polyvinyl Alcohol-Based Resin

It was measured on a Hoppler viscometer with adjusting water temperature to 20° C.

(4) Optical Properties

A degree of polarization, transmittance, and dichroic ratio of each of the resulting polarizing films were measured at wavelengths of 460 nm, 540 nm, and 640 nm using a Multi Channel Retardation Measuring System (RETS-2000 manufactured by Otsuka Electronics Co., Ltd.).

Example 1

In a 200 L tank were placed 42 kg of a polyvinyl alcohol-based resin (A) having a viscosity of a 4% aqueous solution of 107 mPa·s, a degree of saponification of 99.3% by mol, and an amount of the 1,2-glycol bond at the side chain of 1% by mol, 100 kg of water, 4.2 kg of glycerin as a plasticizer (C), 21 g of sodium dodecylsulfonate as a surfactant (D), and 8 g of polyoxyethylene-dodecylamine, and the whole was heated to 150° C. under stirring and homogeneously dissolved. Thereafter, an aqueous solution of the polyvinyl alcohol-based resin composition having a concentration of 26% was obtained after concentration adjustment.

Then, the aqueous solution of the polyvinyl alcohol-based resin composition (liquid temperature: 147° C.) was fed to a twin-screw extruder and subjected to defoaming. The defoamed aqueous solution of the polyvinyl alcohol-based resin composition was cast from a T-type slit die onto a cast roll to form a film. The casting/film formation conditions are as follows.

Drum Roll

Diameter (R1): 3200 mm, Width: 4.3 m, Rotation rate: 8 m/minute, Surface temperature: 90° C., Resin temperature at outlet of T-type slit die: 95° C.

The front side and backside of the resulting film were alternately passed through drying rolls under the following conditions to effect drying.

Drying Roll

Diameter (R2): 320 mm, Width: 4.3 m, Number of rolls: 10 rolls, Rotation rate: 8 m/minute, Surface temperature: 80° C.

The film was subjected to a thermal treatment at 140° C. by means of a floating type drier (length: 18.5 m), from which hot air continuously blew to both sides of the film, to obtain a polyvinyl alcohol-based film for optical uses having a width of 4 m, a thickness of 50 µm, and a length of 4000 m.

Using the polyvinyl alcohol-based film for optical uses of the invention obtained in the above, a polarizing film was obtained in the following manner and then polarizing properties were evaluated.

The resulting polyvinyl alcohol-based film for optical uses was dipped in a water tank having a water temperature of 30° C. with stretching at a magnification of 1.5 times. Then, the film was dipped in a dyeing tank (30° C.) including 0.2 g/L of iodine and 15 g/L of potassium iodide for 240 seconds with stretching at a magnification of 1.3 times. Furthermore, the film was dipped in a boric acid-treating tank (40° C.) including a composition of 50 g/L of boric acid and 30 g/L of potassium iodide with simultaneous uniaxial stretching at a magnification of 2.8 times and boric acid treatment over a period of 5 minutes. Thereafter, the film was dried to obtain a polarizing film.

Then, a triacetylcellulose film having a film thickness of 80 µm was attached to the both surfaces of the resulting polarizing film using a polyvinyl alcohol-based aqueous solution as an adhesive and the whole was dried at 50° C. to obtain a polarizing plate. On the polarizing plate, a degree of polarization and light transmittance were measured. Table 1 shows results of the measurement. As shown in Table 1, a film having a very high polarization performance at the wavelength of 460 nm was obtained.

Separately, stretching was performed under the following conditions and critical stretching magnification was determined.

(Evaluation of Critical Stretching Magnification)

The polyvinyl alcohol-based film was dipped in a water tank having a water temperature of 30° C. with stretching at a magnification of 1.5 times. Then, the film was dipped in a dyeing tank (30° C.) including 0.2 g/L of iodine and 15 g/L of potassium iodide for 240 seconds with stretching at a magnification of 1.3 times. Furthermore, the film was dipped in a boric acid-treating tank (40° C.) including a composition of 50 g/L of boric acid and 30 g/L of potassium iodide with uniaxial stretching at a magnification rate of 40% per minute on the film before dipping in the boric acid-treating tank. The total stretching magnification at breakage relative to the raw film was regarded as critical stretching magnification and evaluation was performed according to the following evaluation criteria.

A: critical stretching magnification of 6.3 times or more
B: critical stretching magnification of 6.0 times to less than 6.3 times
C: critical stretching magnification of 5.7 times to less than 6.0 times
D: critical stretching magnification of less than 5.7 times Example 2

A polyvinyl alcohol-based film for optical uses (length: 4000 m, width: 4 m, thickness: 50 µm) was obtained in the same manner as in Example 1 except that, as the polyvinyl alcohol-based resin, the resin (A) was changed to 21 kg of a polyvinyl alcohol-based resin (A) having a viscosity of a 4% aqueous solution of 107 mPa·s, a degree of saponification of 99.3% by mol, and an amount of the 1,2-glycol bond at the side chain of 1% by mol and 21 kg of an unmodified polyvinyl alcohol-based resin (B) having a viscosity of a 4% aqueous solution of 64 mPa·s and a degree of saponification of 99.8% by mol.

On the resulting polyvinyl alcohol-based film, a polarizing film and a polarizing plate were obtained in the same manner as in Example 1 and a degree of polarization and light transmittance were measured. Table 1 shows the results of the measurement. As shown in Table 1, a film having a very high polarization performance at the wavelength of 460 nm was obtained. Moreover, the evaluation of the critical stretching magnification was separately performed in the same manner as in Example 1. Table 1 shows the results of the measurement.

Example 3

A polyvinyl alcohol-based film for optical uses (length: 4000 m, width: 4 m, thickness: 65 µm) was obtained in the same manner as in Example 1 except that, as the polyvinyl alcohol-based resin, the resin (A) was changed to 6.3 kg of a polyvinyl alcohol-based resin (A) having a viscosity of a 4% aqueous solution of 16 mPa·s, a degree of saponification of 99.7% by mol, and an amount of the 1,2-glycol bond at the side chain of 6% by mol and 35.7 kg of an unmodified polyvinyl alcohol-based resin (B) having a viscosity of a 4% aqueous solution of 64 mPa·s and a degree of saponification of 99.8% by mol.

On the resulting polyvinyl alcohol-based film, a polarizing film and a polarizing plate were obtained in the same manner as in Example 1 and a degree of polarization and light transmittance were measured. Table 1 shows the results of the measurement. As shown in Table 1, a film having a very high polarization performance at the wavelength of 460 nm was obtained. Moreover, the evaluation of the critical stretching magnification was separately performed in the same manner as in Example 1. Table 1 shows the results of the measurement.

Example 4

A polyvinyl alcohol-based film for optical uses (length: 4000 m, width: 4 m, thickness: 65 μm) was obtained in the same manner as in Example 1 except that, as the polyvinyl alcohol-based resin, the resin (A) was changed to 12.6 kg of a polyvinyl alcohol-based resin (A) having a viscosity of a 4% aqueous solution of 30 mPa·s, a degree of saponification of 99.2% by mol, and an amount of the 1,2-glycol bond at the side chain of 1% by mol and 29.4 kg of an unmodified polyvinyl alcohol-based resin (B) having a viscosity of a 4% aqueous solution of 64 mPa·s and a degree of saponification of 99.8% by mol.

On the resulting polyvinyl alcohol-based film, a polarizing film and a polarizing plate were obtained in the same manner as in Example 1 and a degree of polarization and light transmittance were measured. Table 1 shows the results of the measurement. As shown in Table 1, a film having a very high polarization performance at the wavelength of 460 nm was obtained. Moreover, the evaluation of the critical stretching magnification was separately performed in the same manner as in Example 1. Table 1 shows the results of the measurement.

Example 5

A polyvinyl alcohol-based film for optical uses (length: 4000 m, width: 4 m, thickness: 65 μm) was obtained in the same manner as in Example 1 except that, as the polyvinyl alcohol-based resin, the resin (A) was changed to 25.2 kg of a polyvinyl alcohol-based resin (A) having a viscosity of a 4% aqueous solution of 107 mPa·s, a degree of saponification of 99.3% by mol, and an amount of the 1,2-glycol bond at the side chain of 1% by mol and 16.8 kg of an unmodified polyvinyl alcohol-based resin (B) having a viscosity of a 4% aqueous solution of 64 mPa·s and a degree of saponification of 99.8% by mol.

On the resulting polyvinyl alcohol-based film, a polarizing film and a polarizing plate were obtained in the same manner as in Example 1 and a degree of polarization and light transmittance were measured. Table 1 shows the results of the measurement. As shown in Table 1, a film having a very high polarization performance at the wavelength of 460 nm was obtained. Moreover, the evaluation of the critical stretching magnification was separately performed in the same manner as in Example 1. Table 1 shows the results of the measurement.

Example 6

A polyvinyl alcohol-based film for optical uses (length: 4000 m, width: 4 m, thickness: 65 μm) was obtained in the same manner as in Example 1 except that, as the polyvinyl alcohol-based resin, the resin (A) was changed to 2.1 kg of a polyvinyl alcohol-based resin (A) having a viscosity of a 4% aqueous solution of 16 mPa·s, a degree of saponification of 99.8% by mol, and an amount of the 1,2-glycol bond at the side chain of 8% by mol and 39.9 kg of an unmodified polyvinyl alcohol-based resin (B) having a viscosity of a 4% aqueous solution of 64 mPa·s and a degree of saponification of 99.8% by mol.

On the resulting polyvinyl alcohol-based film, a polarizing film and a polarizing plate were obtained in the same manner as in Example 1 and a degree of polarization and light transmittance were measured. Table 1 shows the results of the measurement. As shown in Table 1, a film having a very high polarization performance at the wavelength of 460 nm was obtained. Moreover, the evaluation of the critical stretching magnification was separately performed in the same manner as in Example 1. Table 1 shows the results of the measurement.

Comparative Example 1

A polyvinyl alcohol-based film (length: 4000 m, width: 4 m, thickness: 50 μm) was obtained in the same manner as in Example 1 except that, as the polyvinyl alcohol-based resin, the resin (A) was changed to 42 kg of an unmodified polyvinyl alcohol-based resin having a viscosity of a 4% aqueous solution of 64 mPa·s and a degree of saponification of 99.8% by mol.

On the resulting polyvinyl alcohol-based film, a polarizing film and a polarizing plate were obtained in the same manner as in Example 1 and a degree of polarization and light transmittance were measured. Table 1 shows the results of the measurement. As shown in Table 1, the dichroic ratio at the wavelength of 460 nm was 31.72 and a sufficient polarization performance was not obtained. Moreover, the evaluation of the critical stretching magnification was separately performed in the same manner as in Example 1. Table 1 shows the results of the measurement.

Comparative Example 2

A polyvinyl alcohol-based film (length: 4000 m, width: 4 m, thickness: 50 μm) was obtained in the same manner as in Example 1 except that the polyvinyl alcohol-based resin (A) was changed to a polyvinyl alcohol-based resin (a) having a viscosity of a 4% aqueous solution of 110 mPa·s, a degree of saponification of 99.8% by mol, and an amount of the 1,2-glycol bond at the side chain of 8% by mol.

On the resulting polyvinyl alcohol-based film, formation of a polarizing film was attempted but water resistance was insufficient and no polarizing film could be obtained.

Comparative Example 3

A polyvinyl alcohol-based film (length: 4000 m, width: 4 m, thickness: 50 μm) was obtained in the same manner as in Example 1 except that, as the polyvinyl alcohol-based resin, the resin (A) was changed to 42 kg of a polyvinyl alcohol-based resin having a viscosity of a 4% aqueous solution of 27 mPa·s, a degree of saponification of 99.8% by mol, and an amount of the 1,2-glycol bond at the side chain of 1.8% by mol.

On the resulting polyvinyl alcohol-based film, a polarizing film and a polarizing plate were obtained in the same manner as in Example 1 and a degree of polarization and light transmittance were measured. Table 1 shows the results of the measurement. As shown in Table 1, the dichroic ratio at the wavelength of 460 nm was 27.01 and a sufficient polarization performance was not obtained. Moreover, the evaluation of the critical stretching magnification was separately performed in the same manner as in Example 1. Table 1 shows the results of the measurement.

TABLE 1

|  |  | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|
| PVA (A) | G (% by mol) | 1 | 1 | 6 | 1 | 1 | 8 | 0 | 8 | 0 |
|  | A | 100 | 50 | 15 | 30 | 60 | 5 | 0 | 100 | 0 |
| PVA (B) | B | 0 | 50 | 85 | 70 | 40 | 95 | 100 | 0 | 100 |
| Expression (1) | A * G/(A + B) | 1 | 0.5 | 0.9 | 0.3 | 0.6 | 0.4 | 0 | 8 | 0 |
| Polarizing plate Degree of polarization | 460 nm | 99.99 | 99.99 | 99.99 | 99.99 | 99.99 | 99.99 | 99.94 | — | 99.82 |
|  | 540 nm | 99.95 | 99.96 | 99.97 | 99.96 | 99.95 | 99.96 | 99.91 | — | 99.91 |
|  | 640 nm | 99.89 | 99.85 | 99.94 | 99.92 | 99.84 | 99.88 | 99.78 | — | 99.82 |
| Transmittance | 460 nm | 39.76 | 39.41 | 39.82 | 39.80 | 39.60 | 39.65 | 38.41 | — | 38.22 |
|  | 540 nm | 41.95 | 42.43 | 42.52 | 42.46 | 42.28 | 42.40 | 41.74 | — | 41.75 |
|  | 640 nm | 43.04 | 43.57 | 43.28 | 43.30 | 43.28 | 43.40 | 43.16 | — | 43.15 |
| Dichroic ratio | 460 nm | 44.20 | 42.60 | 44.49 | 44.40 | 43.46 | 43.69 | 31.72 | — | 27.01 |
|  | 540 nm | 48.18 | 52.82 | 55.28 | 53.04 | 50.38 | 52.59 | 43.57 | — | 43.63 |
|  | 640 nm | 50.89 | 52.98 | 57.08 | 55.23 | 50.13 | 53.18 | 46.96 | — | 48.3 |
| Critical stretching magnification |  | C | B | A | A | C | B | D | — | D |

While the invention has been described in detail and with reference to specific embodiments thereof, it will be apparent to one skilled in the art that various changes and modifications can be made therein without departing from the spirit and scope thereof.

The present application is based on Japanese Patent Application No. 2005-024466 filed on Jan. 31, 2005, Japanese Patent Application No. 2005-024467 filed on Jan. 31, 2005, Japanese Patent Application No. 2005-336441 filed on Nov. 22, 2005, and Japanese Patent Application No. 2005-336442 filed on Nov. 22, 2005, and the contents are incorporated herein by reference.

INDUSTRIAL APPLICABILITY

The polyvinyl alcohol-based film for optical uses of the present invention is a film wherein the polyvinyl alcohol-based resin is composed of only a polyvinyl alcohol-based resin (A) containing a 1,2-glycol bond at a side chain and the amount of the 1,2-glycol bond at a side chain is from 0.01 to 6% by mol or a film using a polyvinyl alcohol-based resin (A) containing a 1,2-glycol bond at a side-chain and a polyvinyl alcohol-based resin (B) other than the polyvinyl alcohol-based resin (A) in a specific ratio, so that it is a polyvinyl alcohol-based film excellent in stretching property and has an effect of obtaining a polarizing film excellent in polarization performance throughout the visible light wavelength range, particularly in the vicinity of the wavelength of 460 nm. The film is very useful as a raw film of polarizing films for use in electronic desk calculators, electronic clocks or watches, word processors, personal computers, televisions, handy information terminals, liquid crystal display devices such as instruments for automobiles and machines, sunglasses, eye-protective glasses, 3D glasses, reflection-reducing layers for display devices (CRT, LCD, etc.), medical equipments, building materials, toys, and the like, as a raw film for use in a ½ wavelength plate and a ¼ wavelength plate, and as a raw film of retardation films for use in liquid crystal display devices.

The invention claimed is:

1. A polyvinyl alcohol-based film comprising a polyvinyl alcohol-based resin,
    the polyvinyl alcohol-based resin comprising:
    a polyvinyl alcohol-based resin (A) containing a 1,2-glycol bond at a side chain; and
    a polyvinyl alcohol-based resin (B) other than the polyvinyl alcohol-based resin (A), having a degree of saponification of 98% by mol or more,
    wherein a difference in a degree of saponification between the polyvinyl alcohol-based resin (A) and the polyvinyl alcohol-based resin (B) is in a range of 3% by mol or less,
    a content of the polyvinyl alcohol-based resin (A) is 5 to 30% by weight relative to a total amount of the polyvinyl alcohol-based resin (A) and the polyvinyl alcohol-based resin (B), and
    the polyvinyl alcohol-based resin satisfies the following expression (1):

$$0.01 \le A \times G/(A+B) \le 6 \quad (1),$$

wherein A represents the content (weight %) of the polyvinyl alcohol-based resin (A) relative to the total amount of the polyvinyl alcohol-based resin (A) and the polyvinyl alcohol-based resin (B), B represents a content (weight %) of the polyvinyl alcohol-based resin (B) relative to the total amount of the polyvinyl alcohol-based resin (A) and the polyvinyl alcohol-based resin (B), and G represents an amount (mol %) of the 1,2-glycol bond at a side chain.

2. The polyvinyl alcohol-based film according to claim 1, wherein a viscosity of the polyvinyl alcohol-based resin (A) is from 8 to 400 mPa·s as a viscosity of a 4% by weight aqueous solution.

3. The polyvinyl alcohol-based film according to claim 1, wherein a viscosity of the polyvinyl alcohol-based resin (B) is from 8 to 500 mPa·s as a viscosity of a 4% by weight aqueous solution.

4. The polyvinyl alcohol-based film according to claim 1, which further contains a plasticizer (C).

5. The polyvinyl alcohol-based film according to claim 1, which further contains a surfactant (D).

6. The polyvinyl alcohol-based film according to claim 1, wherein a width of the film is 2 m or more.

7. The polyvinyl alcohol-based film according to claim 1, wherein a thickness of the film is from 30 to 70 μm.

8. A polarizing film comprising the polyvinyl alcohol-based film according to claim 1.

9. A polarizing plate comprising the polarizing film according to claim 8 and a protective film provided on at least one surface of the polarizing film.

* * * * *